United States Patent [19]

Adams et al.

[11] Patent Number: 5,236,227
[45] Date of Patent: Aug. 17, 1993

[54] ASSEMBLY FOR CONNECTING MULTI-DUCT CONDUITS HAVING TAPERED ALIGNMENT WALLS

[76] Inventors: Robert Adams, 5248 Hearst Ave., Metairie, La. 70001; Andrew Cousin, 5333 Canary Ansas Dr., Kenner, La. 70065

[21] Appl. No.: 791,771

[22] Filed: Nov. 12, 1991

[51] Int. Cl.$^5$ .............................................. F16L 39/00
[52] U.S. Cl. .................................... 285/27; 285/137.1
[58] Field of Search ......................... 285/137.1, 18, 27; 138/112, 113

[56] References Cited

U.S. PATENT DOCUMENTS

| | | |
|---|---|---|
| 1,776,484 | 9/1930 | Whitehouse . |
| 1,851,940 | 3/1932 | Williams ............................ 285/137.1 |
| 1,876,627 | 9/1932 | Davis et al. . |
| 3,536,342 | 10/1970 | Hull et al. ............................. 285/27 |
| 3,590,855 | 6/1991 | Woolen ................................ 138/111 |
| 3,811,711 | 5/1974 | Tarkenton .......................... 285/110 |
| 4,544,185 | 10/1985 | Weirich et al. ...................... 285/137 |
| 4,834,825 | 5/1989 | Adams et al. ....................... 156/294 |
| 5,078,432 | 1/1992 | Seiter ................................. 285/137.1 |
| 5,135,265 | 8/1992 | Bouscher et al. ................... 285/137.1 |

FOREIGN PATENT DOCUMENTS

| | | | |
|---|---|---|---|
| 1050450 | 3/1979 | Canada .............................. 285/137.1 |
| 1086665 | 9/1980 | Canada .............................. 285/137.1 |
| 307780 | 3/1989 | European Pat. Off. ......... 285/137.1 |

Primary Examiner—Eric K. Nicholson
Attorney, Agent, or Firm—Pravel, Hewitt, Kimball & Krieger

[57] ABSTRACT

An assembly for the coupling of a multi-duct conduit system for sealing the outer and inner ducts of adjacent conduit sections in end to end relationship. The body portion is adapted to receive a plurality of ducts into bores in the body housing so that a first plurality of ducts enters and is insertible into the body portion at a first end and the second adjoining plurality of duct members are insertible into the body portion on the second end, the first and second portions of ducts being slidably engaged into the body portion and meeting substantially at a center point within the body portion, for defining a continuous pathway within the ducts for housing transmission lines therewithin. There is further provided an end portion on the ends of the body member to serve as a guide for the ducts entering the bores so that the ducts are not damaged as they enter the bores of the body member.

15 Claims, 5 Drawing Sheets

ASSEMBLY FOR CONNECTING MULTI-DUCT CONDUITS HAVING TAPERED ALIGNMENT WALLS

BACKGROUND OF THE INVENTION

Field Of The Invention

The system of the present invention relates to multi-duct conduit systems. More particularly, the apparatus of the present invention relates to an assemblage for more readily introducing inner duct into the main coupling body when interconnecting ducts within a multi-duct conduit system. The improved system would operate in a coupling arrangement when sealingly coupling adjacent conduit sections end-to-end to form the continuing underground conduit system.

General Background

The present inventors have invented and patented a coupling body for sealing in end-to-end relationship the inner ducts and outer housing of underground conduit used in underground transmission systems. That patent issued as U.S. Pat. No. 4,834,825, and is incorporated herein by reference thereto.

In that patent it was explained that for certain transmission systems, wherein cables are laid underground, such as the light cables used in the transmission of telephone lines, in the normal installation of the system, the cables are housed through a light duct work, the ducts laid out in 20 to 30 foot sections, and in certain installations the ducts may appear in groups of three to four each duct housing a number of cables, and the ducts assembled as a group in order to house sufficient cable for the transmission.

Normally, the individual ducts housing the cable are then secured within an exterior main housings such as light-weight PVC pipe, so that the multi-duct housing are contained within a central housing for easier laying of the installation underground.

One of the recurring problems in this particular type of system is that the points at which the 20 to 30 foot lengths of interior housing must be coupled or joined so that the line may be continuously transmitted underground. This juncture, of course, must, in order to be suitable, be of such a nature that the ducts within the outer housing are coupled in such a way, of course, to provide a suitable connection between the ducts, and yet for the most part, be free of moisture and the exterior corrosive elements underground. The coupler body patented in U.S. Pat. No. 4,834,825 addressed these problems and satisfactorily solved them.

One other problem not addressed in the prior art or in the previous U.S. Pat. No. 4,834,825 concerns itself with the positioning of the plurality of inner ducts into the ports in the coupling body. Even with the use of the coupling body patented in the '825 patent, when the inner ducts are in position within the outer housing, and although held substantially firmly in place by the spacers positioned between the inner ducts, there is a tendency for the ducts to separate or be misaligned with the ports in the coupling body. Therefore, when the ducts are inserted into the outer housing for positioning into the coupling body, they often confront the flat face of the coupling body which may cause the inner ducts to become damaged, if the insertion force is substantial.

In addition, even if the ducts are spaced precisely, should the ducts become rotated in misalignment with the ports, they will not set into the ports but will once again confront the flat, blunt end of the coupling body. If the result is a damaged end to one or more inner ducts, the entire length of duct may have to be changed resulting in lost time and manpower and materials.

SUMMARY OF THE PRESENT INVENTION

The assembly of the present invention solves problems and introduces an improved coupling system over what is presently in the art. What is included is an improved assembly utilized in the coupling of a multiduct conduit system for sealing the outer and inner ducts of adjacent conduit sections in end to end relationship, as claimed in U.S. Pat. No. 4,834,825. There is provided the primary coupling housing which includes preferably a pre-molded body portion which is insertible into the outer most housing of a duct system. The body portion is adapted to receive a plurality of ducts into bores in the body housing so that a first plurality of ducts enters and is insertible into the body portion at a first end and the second adjoining plurality of duct members are insertible into the body portion on the second end, the first and second plurality of ducts slidingly engaged into the body portion and meeting substantially at a center point within the body portion, for defining a continuous pathway within the ducts for housing transmission lines therewithin.

The body member further includes an interior gasket within each bore for sealably engaging the interior duct members as they slidably engage therewithin. There is further included an exterior gasket member around the end portion of the exterior body so that when the exterior body is slidably engaged within the exterior housing, the gasket member is such that it engages the inner wall of the housing and eliminates any movement out of the housing of the body portion once engaged therewithin. There is further provided a means within the center juncture of the inner conduits, so that the wall portions of the inner conduits and the center juncture provides a flush surface for the continuous housing of transmission lines therethrough.

The additional improvement provides for an element positioned on at least one end of the coupling body comprising a sloping surface around each opening in the end of the coupling body, so that when the inner ducts are directed toward the coupling body end, the sloping surface directs the ends of the inner ducts down toward the opening, thus eliminating any direct confrontation between the end of the coupling body and the inner ducts end portions.

Therefore, it is a principal object of the present invention to provide a coupling system for transmission lines which is sufficiently sturdy to securely engage the end portions of adjacent line conduits therewithin;

It is still a principal object of the present invention to provide a coupling for adjacent transmission line housings end to end, which through a single body portion provides a secure housing for the line housings therewithin so that there is no potential for break in the system at the point of connection;

It is still a further object of the present invention to provide a connector assembly with substantially a single piece integral body section insertible into an outer housing, wherein adjacent ends of joining conduits are inserted therein and the system securely placed within the outer housing so that little or no movement occurs which may result in uncoupling of the conduits;

It is still a further principal object of the present invention to provide a coupling body having end portions for directing the ends of inner ducts to enter the bores in the coupling body;

It is still a further principal object of the present invention to provide a coupling body wherein the end portions are sculptured so as to provide a greater target area for the inner ducts to enter the bores of the coupling body when one or more of the inner ducts are misaligned with the bores of the coupling body.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT:

Prior to a discussion of the preferred embodiment of the present invention as illustrated in FIGS. 2-8, a discussion of the system in general, as disclosed in U.S. Pat. No. 4,834,825, incorporated by reference hereunto, is provided herein, with reference made to FIG. 1.

Figure 1:
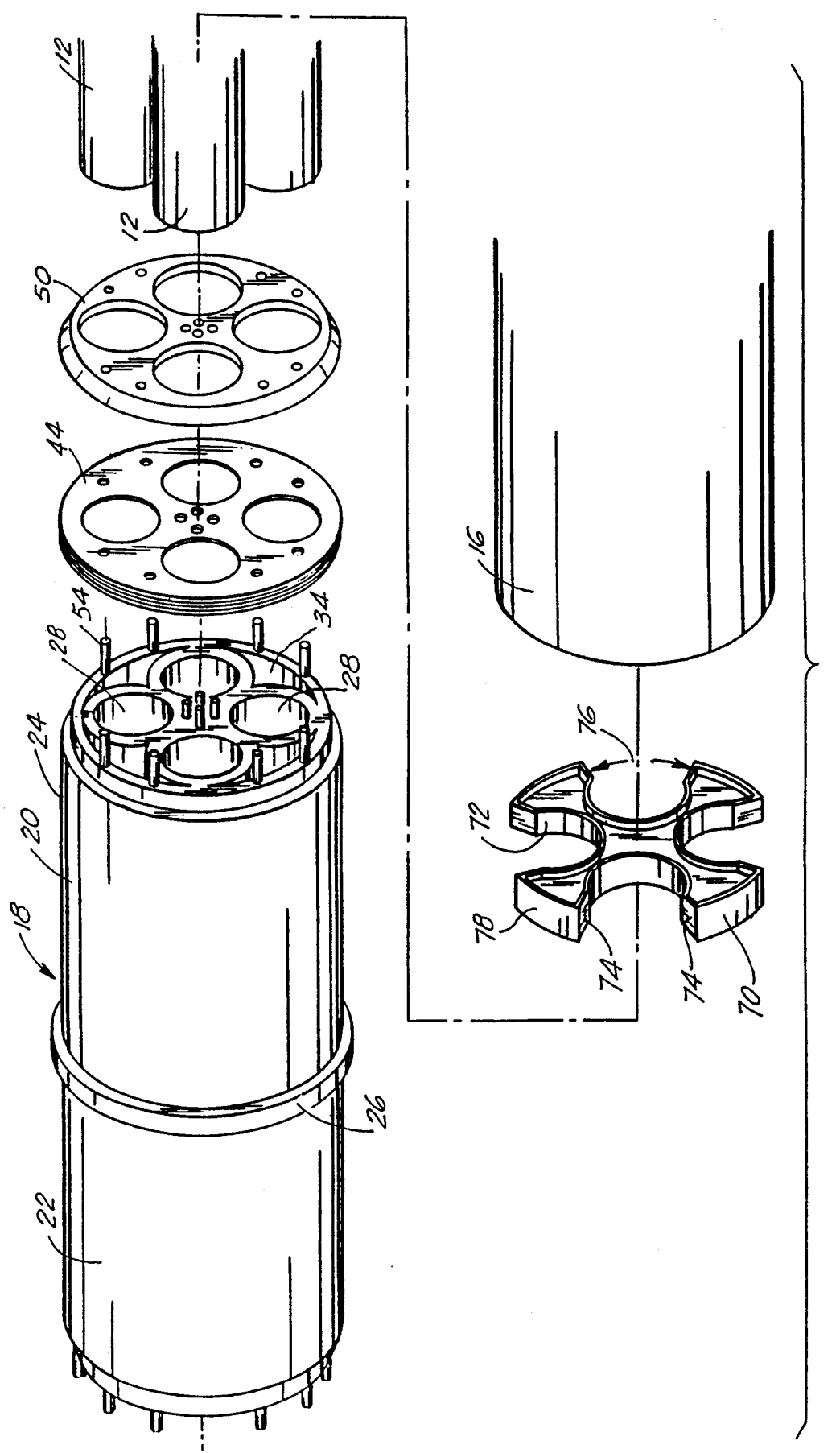
FIG. 1 is an overall exploded view of the components of the connector system insertible into the body portion, as disclosed in U.S. Pat. No. 4,834,825.

For purposes of this discussion, and as is often very common in the art, inner conduits 12 are grouped in groups of 3 or 4, and for the purpose of this application, three or four conduits would be the appropriate groups. The conduits 12 as seen in FIG. 1, are then contained within a principal exterior casing 16 which is of substantially the same length as conduits 12, and serve as a means for protecting the inner conduits 12 and providing an exterior housing to confine the individual inner conduits 12 within casing 16 over the length of the line. For purposes of construction, for the most part, conduits 12 and casing 16 are constructed of lightweight flexible material such as PVC or plastic, and serve as an excellent insulation and housing for transmission lines through bore 14.

Figure 3:
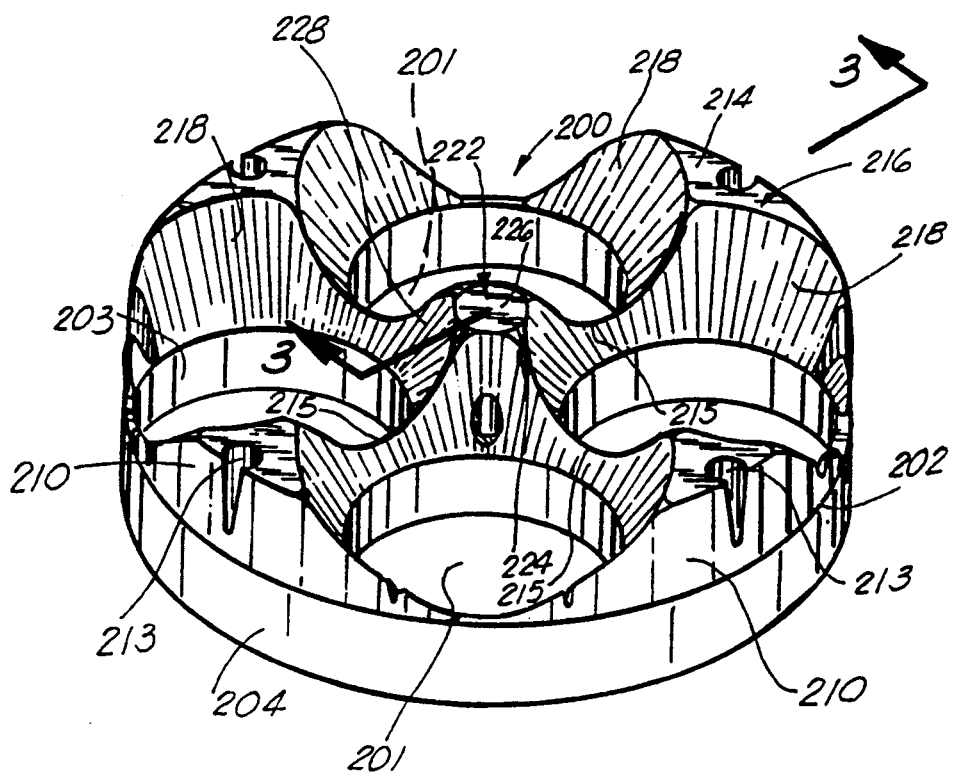
FIG. 3 is an overall view of the improved 4-way end component of the connector body in the preferred embodiment of the present invention.
Figure 5:
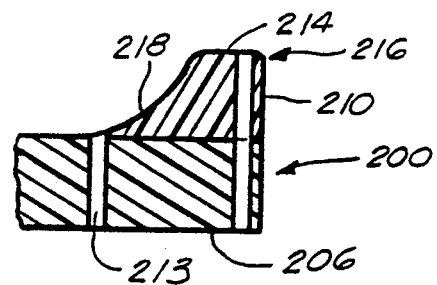
FIG. 5 is a cross-sectional view along lines 3—3 in FIG. 3 of the preferred embodiment of the present invention.
Figure 6:
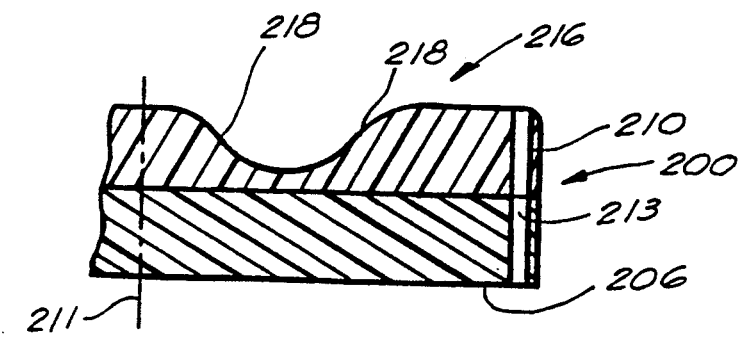
FIG. 6 is a cross-sectional view along lines 4—4 in FIG. 4 of the preferred embodiment of the present invention.

This coupling system is best illustrated and defined in FIG. 1 in exploded view. What is provided in this system is a main coupler body member 18 which preferably would be a molded body portion being of a substantial length, the body portion being divided in a first half body portion 20 and a second half body portion 22, each of the half-body portions 20 and 22 defining a means for receiving a plurality of adjacent ends of conduits 12 therewithin for interconnecting the conduits 12 within body member 18 as seen in FIG. 3. Body member 18 would comprise a continuous molded wall portion 24 having an exterior centrally located mounting ring 26, the purpose of which will be discussed further. Internally, body member 18 contains a plurality of bores 28, each bore 28 being substantially the circumference of the outer diameter of conduits 12, and with bores 28 running throughout the length of body member 18 and meeting at a common point therewithin which would define a stop means for engaging the end 32 of each inner conduit 12. For purposes of construction, stop means 30 would simply comprise a raised wall within the bore 28 having a shoulder portion, of substantially equal thickness to the wall 13 of inner conduits 12, so that when in position within body member 18 and the end 32 of conduit 12 engaging stop, the wall 13 of inner housing 12 and the raised stop provides a continuous wall portion between one adjacent set of conduits 12 and the second adjacent set of conduits 12 that are engaged within the confines of body portion 18. Of course, for purposes of construction, the plurality of bores 28 within body member 18 would coincide precisely with the configuration of the inner conduits 12 as seen in the Figures. It should be noted also that in order to provide for a more lightweight construction of body member 18, there are provided void spaces 34 within body member 18 so that material which would not necessarily be needed in the construction of body portion is eliminated.

Further, as seen in FIG. 1, the body member 18 would further comprise a gasket member 44 which would fit over the end of body member 18 and be held in place by plate member 50. Plate member 50 would be secured to the end of body member 18 via pegs 54, as disclosed in the '825 patent. As will be seen further it is the new and inventive design of plate member 50 which comprises the principal subject matter of the invention disclosed in this application.

Since, as stated earlier, the inner conduits 12 are of some length, the system might further provide a plurality of spacer units 70, each of the spacer units 70 being provided with an interior engaging means 72 defined by a circular wall portion, having a pair of end portions 74 with a space 76 therebetween, so that each of the four conduits 12 may be snappingly engaged along wall portions 72 and held in place by end portions 74 so that the conduits 12 are maintained spaced apart. For purposes of being secured, the spacing member 70 has four outer faces 78 which are identical inner diameter of the wall casing 16, so that the spacer 70 fits securely engaged along the inner surface of the wall of casing 16 in position.

Preferably in construction, spacer 70 would be placed in position along the length of inner conduits 12, the number of spacers 70 along that length as needed, and once engaged would then be slidably accommodated within casing 16 prior to the placement of the main coupling system on each end thereupon.

This structure as previously recited, as well as additional structure of the manner in which the coupling body seals the inner ducts and the outer duct to prevent fluid leakage, is found in detail in the previously issued U.S. Pat. No. 4,834,825 by the same inventors, incorporated herein by reference thereto.

Figure 2:
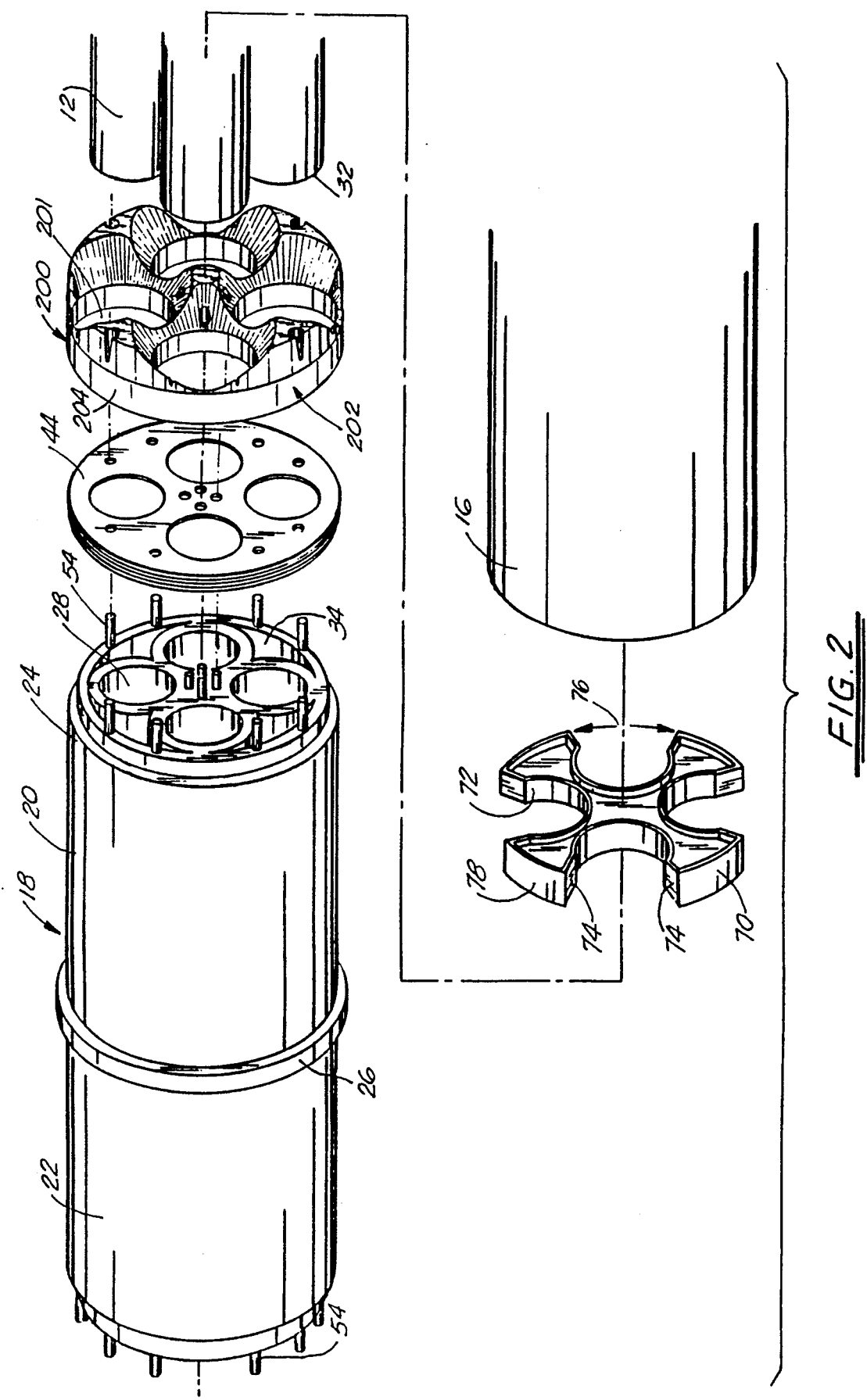
FIG. 2 is an overall exploded view of the present invention showing the components of the connector system insertible into the body system including the improved 4-way end component.

The improvement which is being addressed in this application concerns itself with a means adapted onto the coupling body 18 to allow the sliding engagement of the inner ducts 12 into the bores 28 of the coupling body 18, to eliminate the problem of blunt striking of the ends 32 of the inner ducts 12 against the face of the coupling body 18 that was disclosed in the '825 patent. As illustrated in exploded view in FIG. 2, the improvement comprises a member 200 which would replace the plate 50 that was disclosed in the '825 patent. As seen in FIG. 2, all of the other components of the system are similar, therefore this improved end plate 200 will be discussed in the preferred embodiment.

As illustrated in overall view in FIGS. 2 and 3, end plate 200 serves a means to guide the inner ducts 12 into the bores 28 of the body member 18. As illustrated, end plate 200 would comprise a circular body portion 202 having a circular side wall 204, a first inner face 206, which would be positioned against the face 55 of body member 18, held in position by pins 54. When in position, plate 200 further comprises a plurality of ports 201 which coincide with ports 28 in body member 18 so that the inner ducts 12, can be inserted into body member 18 through ports 201 in end plate 200.

The outer face 208 of end plate 200 would comprise a plurality of contoured means surrounding each bore 201 in the end plate 200 for allowing the insertion of conduits 12 into the bores 28 with ease and to eliminate the cracking or breaking of the conduits 12 when they strike the coupling body 18. This means comprises a raised outer wall portion 210 which extends upward intermediate each bore 28 in the coupling body 18, with the wall 210 sloping downward to its lowest point 212 along the center line of each of the bores 28. This positioning of such wall portion 210 intermediate each port provides a scalloping effect as the walls slope between each bore 28. Whether the end plates be adapted to be positioned upon a 3-way or 4-way coupling body 18, each plate is secured in place in a similar manner as seen in the '825 patent, that is with pens 54 inserted into the ports 213 in end plate 210 and formed in place.

Figure 4:
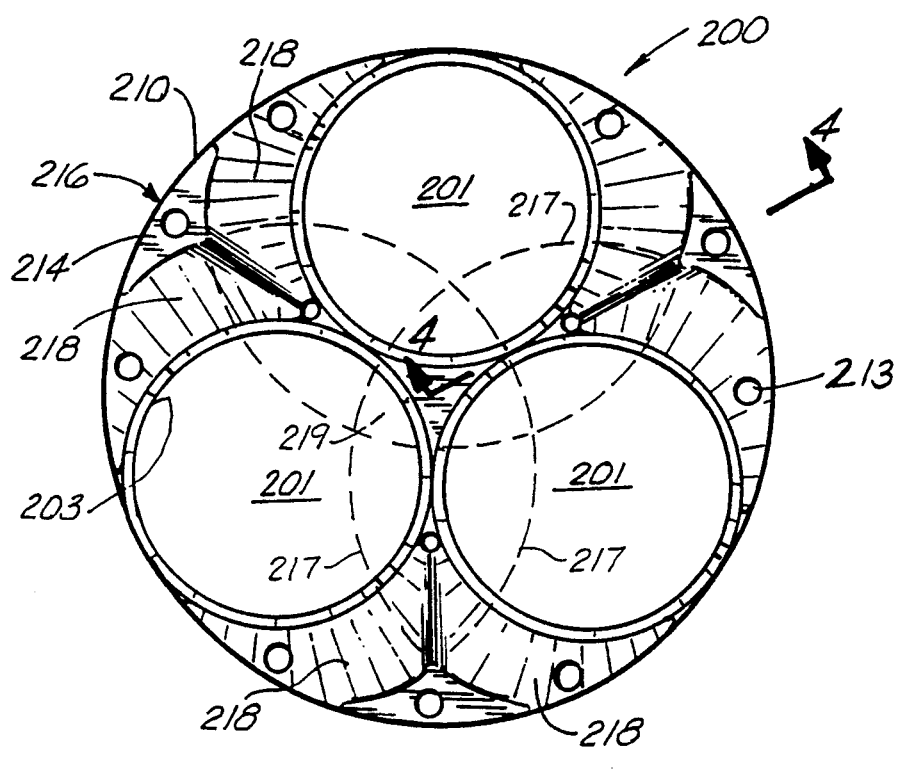
FIG. 4 is an end view of the improved 3-way end component in the preferred embodiment of the present invention.

In the end element 200 which would be configured with a 3-way coupling body, as seen in FIG. 4, the outer wall 210 would include a truncated upper end 214 which would define a horizontal plane 216 (See FIG. 5) at the upper end thereof. There would be further included a pair of walls 218 sloping interiorally from the upper end 214 to the wall of bore 201 and extending from the upper plane 216 and terminating at the circular wall 203 of bore 201. As seen in FIG. 3, the positioning of the raised wall portions 210 intermediate each bore 201 results in a each of the bores 201 having interiorally sloping walls 218 leading into the bores 201, for defining a sloping pathway for the conduit that may be inserted thereinto, and further into bore 28 of the body member 18.

In the case of the 4-way end piece construction, reference is made to the overall view in FIG. 3, where, like the 3-way configuration, there is provided the upper sloping wall 210 intermediate each of the bores 201, each wall truncated into a plane 216, with a pair of inner sloping walls 218 leading into the four bores 201, for defining a similar outer sloping pathway for the conduit. However, as seen in the FIGURES, the 4-way coupling body, because of the four conduits moving therein, include a larger central area 222 in the center of the four bores 201, which defines a possible contact area. Therefore, there is included a raised central member 224, having a truncated top 226, in a horizontal plane, and having a sloping wall 228, extending downward therefrom into each of the four conduit bores 201. Therefore, where the 3-way body 18 has only the sloping walls 218 leading into the bore 201, the 4-way coupling body 18 would include a 3rd sloping wall from the center member 224, for defining a substantial circular sloping pathway into the bore 201 along which a misaligned inner duct 12 may travel as it enters each bore 201.

In both the 3-way or 4-way end piece construction, the end piece or portion 200 would define sloping or tapering wall portions 218 which communicate with the bores 201 of the body member 18. Each of the bores of the body member 18 include a central longitudinal axis 211 (See FIG. 6), the tapering wall portions 218 forming an acute angle with the longitudinal axis 211 of the adjacent bore. The tapering wall portions of adjacent bores would meet along a common edge portion 215 between the bores. In effect, the tapering wall portions 218 each define a smaller passage area and a larger passage area, with the larger area tracking generally circular paths (phantom lines 217 in FIG. 4) intersect the circular paths 217 of adjacent bores. The larger areas define an enlarged target area 219 at an apex region, so while inserting the conduits, they make contact with the large target area 219 and are guided along the tapering wall into the bores. Further, the end means of end portion 200 has an outermost transverse surface area and a plurality of inclined and circumferentially extending wall portions, each defining the tapered annular portion for receiving a conduit. Each tapered annular wall 218 communicates with an adjacent tapered annular wall 218 along the intersecting edge portion 215, which is positioned inside the outermost transverse face of the end 200 generally between the face and the smaller opening or bore 201 in the body member.

Figure 7:
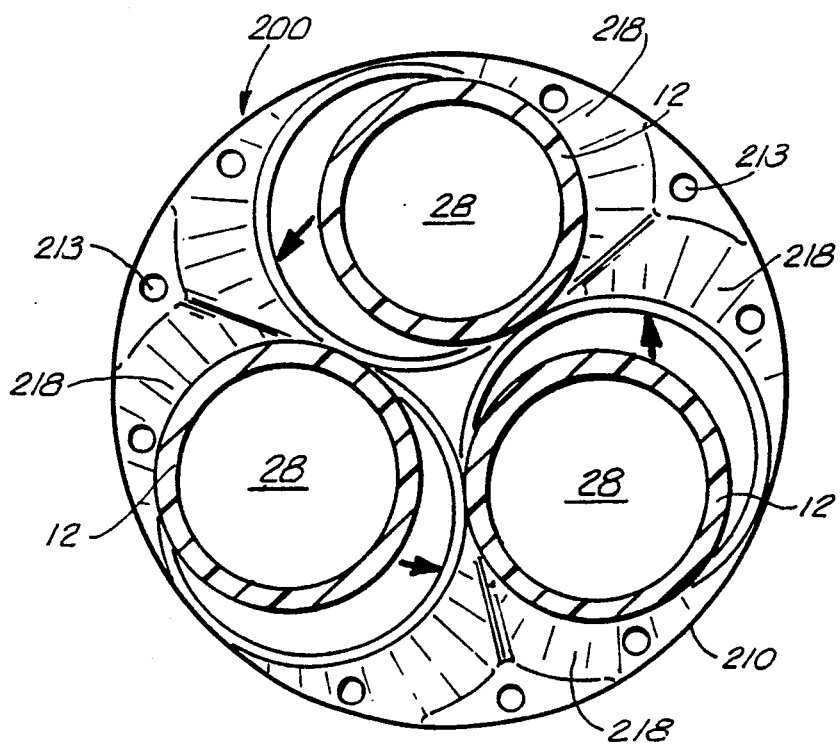
FIG. 7 is an end view illustrating the misalignment of inner ducts being inserted into the coupling body of the present invention.

It should be noted that, as seen in the end view in FIG. 7, a plurality of conduits 12 have been directed toward the bores 28 in a body member 18. FIG. 7 represents the misalignment of the three conduits 12, as they are being directed toward the coupling body 18. However, the sloping walls 218 serve as a means to increase the area in which the conduits 12 may contact the face of the coupling body 12, and if not properly aligned along the width of each bore 28, will slide along the walls 218 and be plugged into the bores 28 with ease, as seen by the arrows 211, wherein the inner duct 18 ends 32 are directed into the bore 28 of the body member 18.

Figure 8A:
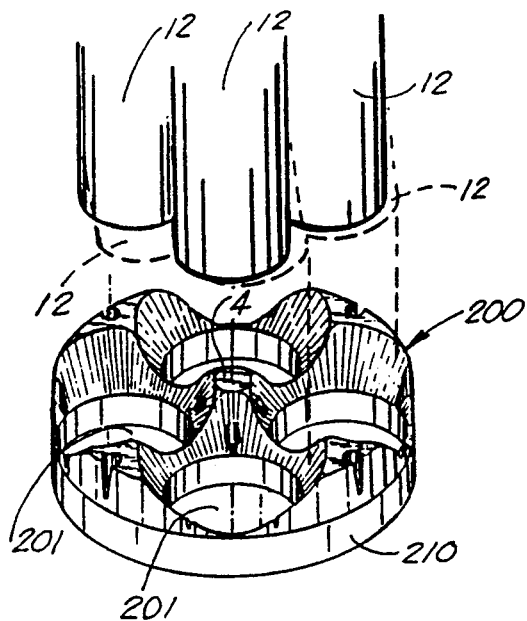
FIGS. 8A-8C illustrate views of the end component of the present invention as inner ducts are out of position when being inserted into the coupling body of the present invention.
Figure 8C:
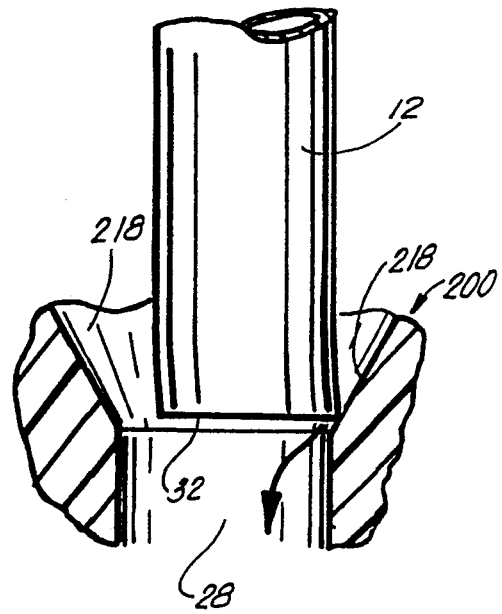
Figure 8B:
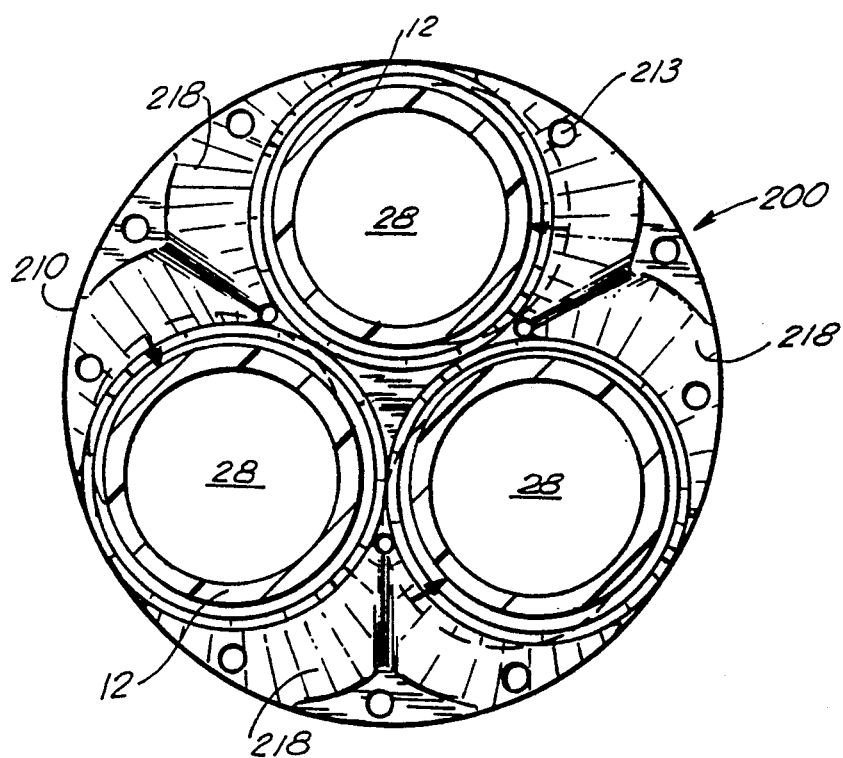

Similarly, FIGS. 8A–8C address the solution to the second problem which is confronted with the insertion of inner duct into the coupling body 18. Quite often, the inner ducts 12, although aligned with bores 28, may have become flared away from the parallel alignment with one another, as designated in phantom view in FIG. 8A, and the ends 32 of the inner ducts 12 would strike the face of the coupling body adjacent each bore 28, as seen in FIG. 8C. However, the present invention would, again, increase the target area that each inner duct would have by allowing the inner duct to make contact with the sloping wall 218 of the bore 201 of the end plate 200, and again be directed down the wall into the bore 28, without making blunt contact with a flat end of a coupling body 12 that is now found in the art. The larger target area, as seen in FIG. 8B, has allowed the flared ends 32 of conduits 12 to move into the bores 201 and then into 28 to slide into engagement therewith, eliminating the direct contact with the face of the end plate, if the end plate were constructed as seen in FIG. 1.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for joining two longitudinally aligned conduit assemblies in end-to-end relationship, each conduit assembly having a plurality of conduits disposed in an outer casing, the apparatus comprising:
   a) a body member having first and second ends, at least one end insertable into the outer casing;
   b) a plurality of bores in the body member, to receive the ends of the conduits from each conduit assembly; and
   c) an end portion on at least the second end of the body portion, the end portion defining tapering wall portions communicating each of the bores of the body member for receiving and guiding the ends of the conduits in the conduit assembly and into the plurality of bores of the body member as the conduits come into contact with the end portion;
   d. each of the bores of the body member having a central longitudinal axis, the tapering wall portions forming an acute angle with the longitudinal axis of the adjacent bore; and
   e. the tapering wall portions of adjacent bores meeting along a common edge portion between the bores.

2. The apparatus in claim 1, wherein the means for receiving and guiding the ends of the conduits into the plurality of bores in the coupling body further comprises a plurality of sloping walls substantially surrounding the ends of the bores for allowing the conduit to slide down the walls into the bores of the body member.

3. The apparatus in claim 2, wherein each of the sloping walls further define a means to provide a greater surface area in which the ends of the conduits can strike the end of the coupling body and enter the bores in the coupling body.

4. The apparatus in claim 1, further comprising flexible gasket means positioned in a wall of each of the bores at each end of the body member, for providing a seal between the body member and each of the conduits.

5. The apparatus of claim 1, further comprising: a gasket member adjacent each end of the body member and each of the conduits.

6. The apparatus of claim 1, further comprising spacer members to align the conduits within the outer casing.

7. The apparatus of claim 5, wherein the flexible gasket means also provide a seal between the body member and the casing.

8. The apparatus of claim 7, wherein the gasket means are secured to the body member with plate members.

9. An apparatus for joining two longitudinally aligned conduit assemblies in end-to-end relationship, each conduit assembly having a plurality of conduits disposed in an exterior casing, the apparatus comprising:
   a) a cylindrical body portion, circular in cross-section, having first and second end portions, at least the first end portion insertable into the exterior casing;
   b) the cylindrical body portion further comprising a plurality of circular bores, each bore receiving a conduit in sealing relationship with the wall of each of the bores in the cylindrical body portion as each conduit is positioned in each bore;
   c) means on the second end of the cylindrical body portion, further comprising a tapering wall portion communicating with an adjacent bore, the tapering wall portions each defining a smaller passage area and a larger passage area, the larger areas tracking generally circular paths which intersect the circular paths of adjacent bores, and the larger areas defining an enlarged target area, so that as the end of each conduit is being inserted into the bores of the body portion, a conduit first engages an enlarged target area and is aligned with and guided into the bores along the tapering wall; and
   d) exterior sealing means positioned on the outer surface of the cylindrical body portion for sealing the first and second ends of the cylindrical body portion against the inner wall of the exterior casing, the casing encircling the cylindrical body portion, and the cylindrical body portion defining an uninterrupted pathway through the plurality of conduits aligned end-to-end within the cylindrical body portion.

10. An apparatus for joining two longitudinally aligned conduit assemblies in end-to-end relationship, each conduit assembly having a plurality of conduits at least partially disposed in an exterior casing, the apparatus comprising:
   a) a cylindrical body portion, circular in cross-section, and having first and second end portions, at least the first end portion positioned in the exterior casing;
   b) the cylindrical body portion having a plurality of bores for receiving a plurality of conduits therein; and
   c) end means positioned on the second end portion for receiving the conduits, the end means providing tapering wall portions that communicate respectively with each of the plurality of bores, the tapering walls of adjacent bores meeting at an apex region, the walls and the apex region together defining an enlarged target area against which each of the conduits can make contact, so that the conduits can be guided along the tapering walls and aligned for insertion into their respective bores.

11. The apparatus in claim 10, wherein the guide means further comprises a plurality of sloping walls to allow the ends of the conduits to slide into the bores of the body portion.

12. The apparatus in claim 10, wherein the sloping walls increase the surface area the conduits can make contact with the body portion and enter the bores of the body portion.

13. The apparatus in claim 10, wherein the guide means defines a means to prevent damage to the conduit as it strikes the face of the body portion.

14. The apparatus in claim 10 wherein there may be further provided a second guide means on the second end of the cylindrical body portion.

15. An apparatus for joining two longitudinally aligned conduit assemblies in end-to-end relationship, each conduit assembly having a plurality of conduits at least partially disposed in an exterior casing, the apparatus comprising:
   a) a cylindrical body portion, circular in cross-section, and having first and second end portions, at least the first end portion positioned in the exterior casing;
   b) the cylindrical body portion having a plurality of bores for receiving a plurality of conduits therein;
   c) end means positioned on the second end portion for receiving the conduits, the end means having an outermost transverse surface area and a plurality of inclined and circumferentially extending wall portions, each defining a tapered annular portion for receiving a conduit;
   d) each tapered annular portion communicating with an adjacent tapered annular portion along an intersecting edge portion;
   e) each tapered annular portion having an innermost, smaller opening portion that is generally circular in shape; and
   f) the intersecting edge portion positioned inside the outermost transverse face generally between said face and said smaller opening portion.

* * * * *

REEXAMINATION CERTIFICATE (3071th)

United States Patent [19]
Adams et al.

[11] B1 5,236,227
[45] Certificate Issued Dec. 3, 1996

[54] ASSEMBLY FOR CONNECTING MULTI-DUCT CONDUITS HAVING TAPERED ALIGNMENT WALLS

[75] Inventors: Robert Adams, Metairie; Andrew Cousin, Kenner, both of La.

[73] Assignee: Opti-Com Manufacturing Network, Inc., Harahan, La.

Reexamination Requests:
No. 90/003,853, Jun. 7, 1995
No. 90/004,233, Feb. 21, 1996

Reexamination Certificate for:
Patent No.: 5,236,227
Issued: Aug. 17, 1993
Appl. No.: 791,771
Filed: Nov. 12, 1991

[51] Int. Cl.$^6$ .................................................. F16L 39/00
[52] U.S. Cl. ........................................ 285/27; 285/137.1

[56] References Cited

U.S. PATENT DOCUMENTS

| | | |
|---|---|---|
| 3,121,583 | 2/1964 | Damm . |
| 3,340,932 | 9/1967 | Bloudoff . |
| 4,834,825 | 5/1989 | Adams . |
| 5,078,432 | 1/1992 | Seiter . |
| 5,236,227 | 8/1993 | Adams . |

OTHER PUBLICATIONS

Robert Waterbury, *Designing Parts for Automated Assembly* ("Waterbury").

*Primary Examiner*—Eric K. Nicholson

[57] ABSTRACT

An assembly for the coupling of a multi-duct conduit system for sealing the outer and inner ducts of adjacent conduit sections in end to end relationship. The body portion is adapted to receive a plurality of ducts into bores in the body housing so that a first plurality of ducts enters and is insertible into the body portion at a first end and the second adjoining plurality of duct members are insertible into the body portion on the second end, the first and second portions of ducts being slidably engaged into the body portion and meeting substantially at a center point within the body portion, for defining a continuous pathway within the ducts for housing transmission lines therewithin. There is further provided an end portion on the ends of the body member to serve as a guide for the ducts entering the bores so that the ducts are not damaged as they enter the bores of the body member.

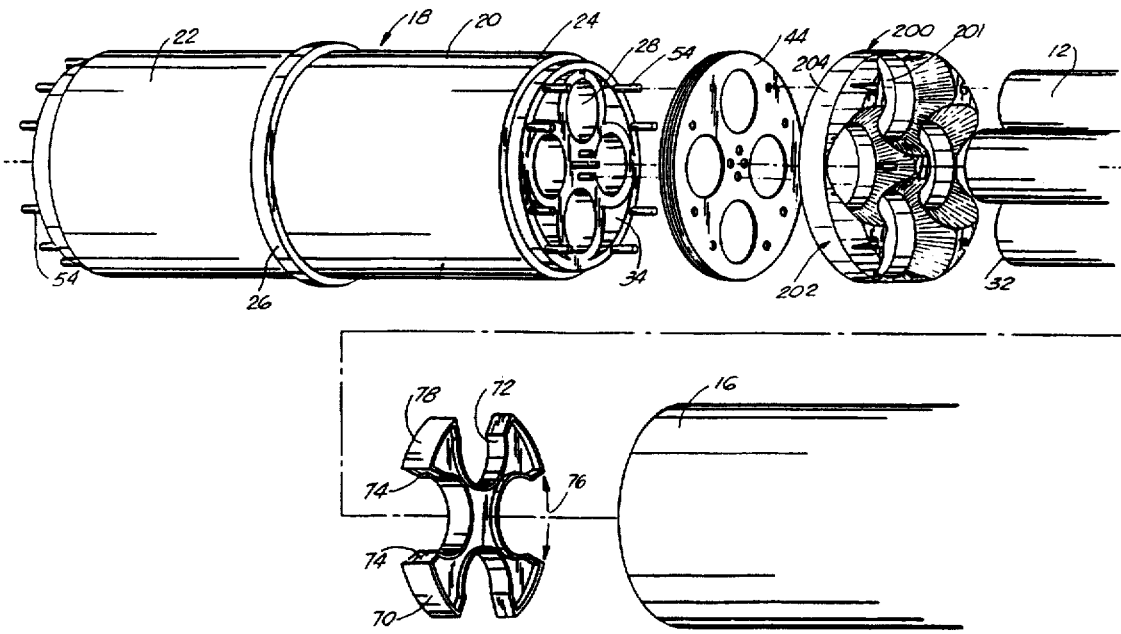

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–15 are cancelled.

* * * * *